United States Patent
Yan et al.

(10) Patent No.: US 12,035,197 B2
(45) Date of Patent: *Jul. 9, 2024

(54) COMMUNICATION METHOD, NETWORK DEVICE, AND TERMINAL

(71) Applicant: Huawei Technologies Co., Ltd., Shenzhen (CN)

(72) Inventors: Le Yan, Shenzhen (CN); Hongping Zhang, Shenzhen (CN); Qinghai Zeng, Shanghai (CN); Min Xu, Shenzhen (CN); Wenjie Peng, Shanghai (CN); Xiaoying Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/866,228

(22) Filed: Jul. 15, 2022

(65) Prior Publication Data
US 2022/0353777 A1    Nov. 3, 2022

Related U.S. Application Data

(63) Continuation of application No. 16/580,004, filed on Sep. 24, 2019, now Pat. No. 11,412,432, which is a (Continued)

(30) Foreign Application Priority Data

Mar. 24, 2017   (CN) .......................... 201710184282.9

(51) Int. Cl.
*H04W 36/30* (2009.01)
*H04W 36/00* (2009.01)
(Continued)

(52) U.S. Cl.
CPC ..... *H04W 36/305* (2018.08); *H04W 36/0077* (2013.01); *H04W 36/00837* (2018.08);
(Continued)

(58) Field of Classification Search
None
See application file for complete search history.

(56) References Cited

U.S. PATENT DOCUMENTS

| | | | |
|---|---|---|---|
| 2009/0104924 A1 | 4/2009 | Yi et al. | |
| 2009/0303891 A1 | 12/2009 | Lucas et al. | |

(Continued)

FOREIGN PATENT DOCUMENTS

| | | |
|---|---|---|
| CN | 1753558 A | 3/2006 |
| CN | 101466118 A | 6/2009 |

(Continued)

OTHER PUBLICATIONS

"Corrections to makeBeforeBreak Handover," Agenda Item: 8.6.3, Source: Nokia, Alcatel-Lucent Shanghai Bell, WID/SID: LTE_eMob-Core-Release 14, Document for: Discussion and Decision, 3GPP TSG-RAN WG2 Meeting #96, R2-168425, Reno, USA, Nov. 14-18, 2016, 12 pages.

(Continued)

*Primary Examiner* — Jeffrey M Rutkowski
*Assistant Examiner* — Luna Weissberger
(74) *Attorney, Agent, or Firm* — Slater Matsil, LLP

(57) ABSTRACT

This application provides a communication method, a network device, and a terminal. The communication method includes: determining, by a first network device, at least one candidate target cell and first configuration information, where the first configuration information is used to trigger a terminal to determine one of the at least one candidate target cell as a to-be-handed-over-to cell; and sending, by the first network device, a first message to the terminal, where the (Continued)

first message includes first cell indication information and the first configuration information, and the first cell indication information is used to indicate the at least one candidate target cell.

12 Claims, 6 Drawing Sheets

Related U.S. Application Data continuation of application No. PCT/CN2018/080282, filed on Mar. 23, 2018.

(51) Int. Cl.
 *H04W 36/08* (2009.01)
 *H04W 74/0833* (2024.01)
 *H04W 76/11* (2018.01)

(52) U.S. Cl.
 CPC ....... *H04W 36/08* (2013.01); *H04W 74/0833* (2013.01); *H04W 76/11* (2018.02)

(56) References Cited

U.S. PATENT DOCUMENTS

| | | | |
|---|---|---|---|
| 2010/0254348 A1 | 10/2010 | Prakash et al. | |
| 2014/0120921 A1 | 5/2014 | Keskitalo et al. | |
| 2014/0126545 A1 | 5/2014 | Tamura et al. | |
| 2015/0038148 A1* | 2/2015 | Park | H04W 36/08 455/437 |
| 2015/0092744 A1 | 4/2015 | Singh et al. | |
| 2015/0117399 A1 | 4/2015 | Yang et al. | |
| 2015/0119043 A1 | 4/2015 | Gopal et al. | |
| 2016/0007255 A1* | 1/2016 | Sharma | H04W 36/08 370/331 |
| 2016/0205578 A1 | 7/2016 | Lee et al. | |
| 2016/0255675 A1* | 9/2016 | Van Lieshout | H04L 1/1867 370/329 |
| 2018/0117399 A1 | 5/2018 | Meetin | |
| 2019/0281511 A1 | 9/2019 | Susitaival et al. | |

FOREIGN PATENT DOCUMENTS

| | | |
|---|---|---|
| CN | 101505514 A | 8/2009 |
| CN | 102421154 A | 4/2012 |
| CN | 103945473 A | 7/2014 |
| CN | 105228200 A | 1/2016 |
| CN | 105992288 A | 10/2016 |
| CN | 106063328 A | 10/2016 |
| CN | 106332200 A | 1/2017 |
| CN | 106376015 A | 2/2017 |
| CN | 106171007 B | 9/2019 |
| EP | 2833669 A1 | 2/2015 |
| WO | 2011103745 A1 | 9/2011 |

OTHER PUBLICATIONS

3GPP TS 36.300 V14.1.0 (Dec. 2016), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), 317 pages.

3GPP TS 36.331 V14.2.0 (Mar. 2017), 3rd Generation Partnership Project; Technical Specification Group Radio Access Network; Evolved Universal Terrestrial Radio Access (E-UTRA); Radio Resource Control (RRC); Protocol specification (Release 14), 720 pages.

3GPP TS 36.423 V14.1.0 (Jan. 2017), 3rd Generation Partnership Project; Technical Specification Group Radio Access Network; Evolved Universal Terrestrial Radio Access Network(E-UTRAN); X2 application protocol (X2AP)(Release 14), 240 pages.

Huawei, HiSilicon, "Simultaneous Data Transmission in Inter-eNB Handover", 3GPP TSG-RAN WG2 Meeting #94 , R2-163657, May 23-27, 2016, 4 pages, Nanjing, P.R.China.

Huawei, HiSilicon, "0ms mobility interruption in NR", 3GPP TSG-RAN WG2 Meeting #96, R2-168564, Nov. 14-18, 2016, 6 pages, Reno, Nevada.

ZTE, "Further Consideration on eLTE Mobility Enhancement", 3GPP TSG RAN WG3 Meeting#92, R3-161143, May 23-27, 2016, 4 pages, Nanjing, China.

ZTE, China Unicorn, "Impacts on RAN3 by Down-selected ME Solutions", 3GPP TSG RAN WG3 Meeting##93bis, R3-162103, Oct. 10-14, 2016, 3 pages, Sophia-Antipolis, France.

\* cited by examiner

COMMUNICATION METHOD, NETWORK DEVICE, AND TERMINAL

CROSS-REFERENCE TO RELATED APPLICATIONS

This application is a continuation of U.S. patent application Ser. No. 16/580,004, filed on Sep. 24, 2019, which is a continuation of International Application No. PCT/CN2018/080282, filed on Mar. 23, 2018, which claims priority to Chinese Patent Application No. 201710184282.9, filed on Mar. 24, 2017. All of the afore-mentioned patent applications are hereby incorporated by reference in their entireties.

TECHNICAL FIELD

This application relates to the communications field, and more specifically, to a communication method, a network device, and a terminal.

BACKGROUND

In a wireless communications system, when quality of a link between a terminal and a serving cell increasingly deteriorates and/or quality of a link between the terminal and a neighboring cell increasingly improves, the terminal is handed over to the neighboring cell. An existing handover procedure is as follows.

A source base station sends measurement configuration information to the terminal, and the terminal performs measurement based on the measurement configuration information. When a condition for reporting a measurement report is met, the terminal reports a measurement result to the source base station. After selecting an appropriate target base station by making a handover decision based on the measurement result reported by the terminal, the source base station sends a handover request message to the target base station. After receiving the handover request message, the target base station makes an admission control decision, in other words, determines whether to admit the handover request. If the target base station admits the handover request, the target base station returns a handover request acknowledgment message to the source base station. The handover request acknowledgment message carries a parameter configured by the target base station for the terminal. After receiving the handover request acknowledgment message, the source base station sends a handover command to the terminal. The handover command carries the parameter configured by the target base station for the terminal. After receiving the handover command, the terminal accesses the target base station based on the parameter carried in the handover command.

In the foregoing handover manner of the terminal, a relatively high handover failure rate occurs on the terminal, consequently affecting data communication of the terminal. For example, when the terminal moves fast or there is an obstacle between the terminal and the source base station or when a 5G high frequency system (whose operating frequency band is greater than or equal to 6 GHz) is concerned, handover of the terminal fails.

SUMMARY

This application provides a communication method, a network device, and a terminal, to increase a handover success rate of a terminal, thereby improving communication quality of the terminal.

According to a first aspect, this application provides a communication method. The communication method includes: determining, by a first network device, at least one candidate target cell and first configuration information, where the first configuration information is used to trigger a terminal to determine one of the at least one candidate target cell as a to-be-handed-over-to cell, and the first network device is a network device to which a serving cell currently accessed by the terminal belongs; and sending, by the first network device, a first message to the terminal, where the first message includes first cell indication information and the first configuration information, and the first cell indication information is used to indicate the at least one candidate target cell.

In the communication method, the first network device sends the first cell indication information and the first configuration information to the terminal, so that the terminal may determine, based on the first message, whether the terminal needs to be handed over to the candidate target cell indicated by the first cell indication information, and determine a cell that is of the at least one candidate target cell and to which the terminal needs to be handed over. Then the terminal may be handed over to the cell. In this way, even if the terminal moves fast or there is an obstacle between the terminal and a source base station affecting signal quality between the terminal and the source base station, the terminal can still be handed over to a target cell, so that a handover success rate of the terminal can be increased and communication quality of the terminal is improved.

With reference to the first aspect, in a first possible implementation, the first message may further include at least one of the following information: valid time or a valid period of the first message, first indication information, or second configuration information, the first indication information is used to indicate a handover priority of the at least one candidate target cell, and the second configuration information is used by the terminal to cancel an operation of determining, based on the first message, the to-be-handed-over-to cell.

If the first message includes the valid time of the first message, the terminal may perform a first operation based on the first message within the valid time, but does not perform the first operation based on the first message any longer when the valid time expires. In this way, resource utilization of the terminal can be improved.

It should be understood that the valid time of the first message may be understood as valid time of various information included in the first message.

If the first message includes the first indication information, the terminal may determine the to-be-handed-over-to cell based on the first configuration information in the first message and other information by using the candidate target cell priority indicated by the first indication information. Specifically, the terminal may determine a candidate target cell with a high priority as the to-be-handed-over-to cell. In this way, the terminal can determine a better to-be-handed-over-to cell, thereby further increasing the handover success rate of the terminal.

If the first message includes the second configuration information, the terminal may determine, according to the second configuration information, that there is no need to determine the to-be-handed-over-to cell based on various information in the first message, in other words, cancel the operation of determining the to-be-handed-over-to cell. In this way, resource utilization of the terminal can be improved.

With reference to the first aspect or the first possible implementation, in a second possible implementation, the communication method may further include: sending, by the first network device, a second message to a second network device, where the second message includes indication information of a second cell belonging to the second network device; and receiving, by the first network device, a response message for the second message, where the response message for the second message includes indication information of a cell that is of the second cell and that the terminal is allowed to access, and the determining, by a first network device, at least one candidate target cell may specifically include: determining, by the first network device, the at least one candidate target cell based on the indication information of the cell that is of the second cell and that the terminal is allowed to access.

The second message may be a handover request message or another message. If the second message is a handover request message, the handover request message may carry one piece of indication information, for example, indication information of a binary bit "0" or "1", a Boolean value, or an information element, to indicate that the handover request message is a handover request message for a scenario of determining the to-be-handed-over-to cell by the terminal, to distinguish the handover request message from a conventional handover request message.

In this implementation, the first network device first sends information about one or more candidate cells to the second network device, and requests the second network device to determine a cell that is of the one or more candidate cells and that the terminal may be handed over to. Then the first network device may use the cell determined by the second network device as the candidate target cell of the terminal, and send, to the terminal, the first cell indication information used to indicate the candidate target cells. Because the candidate target cell is determined by the second network device, the handover success rate after the terminal determines to be handed over to the candidate target cell is higher. In other words, this implementation can further increase the handover success rate of the terminal.

It should be noted that the first network device may send the second message to a plurality of different second network devices, receive cell indication information sent by the plurality of second network devices, and finally send the first cell indication information to the terminal. In this case, the candidate target cell indicated by the first cell indication information is a cell that the plurality of second network devices allow the terminal to access.

Optionally, the first network device may send measurement configuration information to the terminal, and receive a measurement report that is sent by the terminal based on the measurement configuration information. Then the first network device may determine, based on cell signal quality recorded in the measurement report, a candidate cell to which the terminal may be handed over, and send the second message to a network device to which the candidate cell belongs. In other words, the candidate cell carried in the second message sent by the first network device to the second network device may be determined by the first network device based on the signal quality reported by the terminal. In this way, the candidate target cell finally indicated by the first network device to the terminal is a cell that is more suitable for handover, so that the handover success rate of the terminal can be further increased.

With reference to the second possible implementation, in a third possible implementation, the second message may further carry a context of the terminal.

In this implementation, before sending the first cell indication information and the first configuration information to the terminal, the first network device may first send the context of the terminal to the second network device. In this way, when the terminal determines, based on the first message, to perform handover and is handed over to a cell of the at least one candidate target cell, a second network device to which the cell belongs already stores the context of the terminal, so that communication between the terminal and the second network device can start more quickly, thereby improving communication quality of the terminal.

With reference to the third possible implementation, in a fourth possible implementation, the second message may further carry valid time of the context of the terminal.

In this implementation, the second message sent by the first network device to the second network device may further carry the valid time of the context of the terminal, to indicate the second network device to release the context after the valid time expires. In this way, the second network device can release the context of the terminal after the valid time expires.

With reference to any one of the second to the fourth possible implementations, in a fifth possible implementation, the response message for the second message may further carry third configuration information, the third configuration information may include at least one of the following information: a first temporary identifier or information about a first dedicated random access channel (RACH) preamble that are allocated by the second network device to the terminal, and the first temporary identifier and the information about the first dedicated RACH preamble are used by the terminal to access all or some cells that are of the second cell of the second network device and that the terminal is allowed to access. Correspondingly, the first message sent by the first network device to the terminal may further include the third configuration information.

In this implementation, if the third configuration information received by the first network device from the second network device includes the temporary identifier allocated by the second network device to the terminal, and the temporary identifier is sent to the terminal in the first message, the terminal may be handed over to the second network device based on the temporary identifier. In this way, the handover success rate of the terminal can be further increased.

If the third configuration information received by the first network device from the second network device includes the information about the dedicated RACH preamble allocated by the second network device to the terminal, and the information about the dedicated RACH preamble is sent to the terminal in the first message, the terminal may perform a random access procedure in the to-be-handed-over-to cell based on the information about the dedicated RACH preamble. In this way, the handover success rate of the terminal can be further increased.

It should be noted that the first dedicated RACH preamble includes a dedicated RACH preamble, allocated by the second network device to the terminal, used to access each cell that is of the second cell and that the terminal is allowed to access. The first temporary identifier includes a temporary identifier, allocated by the second network device to the terminal, used to access each cell that is of the second cell and that the terminal is allowed to access.

It should be understood that when the second message sent by the first network device to the second network device further includes the valid time of the context of the terminal, the valid time may also be valid time of the first temporary identifier and the information about the first dedicated RACH preamble. To be specific, when the valid time expires, the second network device may release the first temporary identifier and the information about the first dedicated RACH preamble.

With reference to any one of the second to the fifth possible implementations, in a sixth possible implementation, the communication method may further include: sending, by the first network device, second indication information to the second network device, where the second indication information is used to indicate the second network device to release a resource allocated, based on the second message, by the second network device to the terminal.

Specifically, if the second message sent by the first network device to the second network device includes the context of the terminal, the second network device may release the context of the terminal according to the second indication information. If the second network device allocates the first temporary identifier to the terminal, the second network device may release the first temporary identifier according to the second indication information. If the second network device allocates the first dedicated RACH preamble to the terminal, the second network device may release the first dedicated RACH preamble according to the second indication information. In this way, the second network device can allocate a resource to another terminal, so that a handover success rate of the another terminal can be increased.

Optionally, the first network device may send the second indication information to the second network device when determining to reconfigure the terminal.

Optionally, after sending the second indication information to the second network device, the first network device may further send a new second message to the second network device. The new second message may carry a new context of the terminal after reconfiguration of the terminal, or indicate the second network device to allocate a new first temporary identifier or first dedicated RACH preamble to the terminal.

Alternatively, after determining to reconfigure the terminal, the first network device may send a new second message to the second network device. After receiving the new second message, the second network device may release information carried in the original second message, or allocate a new first temporary identifier or first dedicated RACH preamble to the terminal. In this case, the first network device may not send the dedicated second indication information to the second network device.

With reference to any one of the first aspect or the first to the sixth possible implementations, in a seventh possible implementation, the communication method may further include: sending, by the first network device, third indication information to the terminal, where the third indication information is used to indicate the terminal to cancel the operation of determining, based on the first message, the to-be-handed-over-to cell.

In this implementation, when determining that the terminal does not need to be handed over, the first network device may send the third indication information to the terminal, to indicate the terminal to cancel the operation of determining, based on the first message, the to-be-handed-over-to cell, in other words, indicate the terminal not to determine, based on the first message, the to-be-handed-over-to cell. In this way, a resource of the terminal can be saved, and the handover success rate of the terminal can be further increased.

Optionally, the third indication information may be carried in a radio resource control reconfiguration message, or an RRC reconfiguration message itself may implicitly indicate the terminal to cancel the operation of determining the to-be-handed-over-to cell.

Further, optionally, after indicating, by using the RRC reconfiguration message, the terminal to cancel determining of the to-be-handed-over-to cell, the first network device may further send a new first message to the terminal.

It should be noted that if the first network device reconfigures only related information of the first network device on the terminal when reconfiguring the terminal, after receiving the RRC reconfiguration message, the terminal may not cancel determining of the to-be-handed-over-to cell, but update the related information of the first network device on the terminal.

With reference to any one of the first aspect or the first to the seventh possible implementations, in an eighth possible implementation, the communication method may further include: receiving, by the first network device, fourth indication information sent by the terminal, where the fourth indication information is used to indicate the first network device to send the first message to the terminal. Correspondingly, the sending, by the first network device, a first message to the terminal may include: sending, by the first network device, the first message to the terminal according to the fourth indication information.

In this implementation, the first network device receives the fourth indication information of the terminal, and sends the first message to the terminal according to the fourth indication information of the terminal. In other words, when receiving no fourth indication information of the terminal, the first network device may make a handover decision based on the measurement report sent by the terminal, and control, by sending a handover command to the terminal, the terminal to perform handover. This implementation can improve handover flexibility of the terminal.

With reference to any one of the first aspect or the foregoing possible implementations, in a ninth possible implementation, the communication method further includes: receiving, by the first network device, a sequence number status information request message sent by the second network device, where the terminal has been handed over to the second network device.

In the communication method, after the terminal accesses the second network device, the first network device forwards data received by the first network device to the second network device according to a request of the second network device. In this way, communication efficiency can be improved.

With reference to any one of the first aspect or the first to the third possible implementations, in a tenth possible implementation, the communication method may further include: receiving, by the first network device, a context request message sent by the second network device, where in this case, the terminal has been handed over to the second network device, the second network device is a network device to which the to-be-handed-over-to cell belongs, and the context request message is used to request the context of the terminal; and sending, by the first network device, the context of the terminal to the second network device.

In this implementation, after the terminal is handed over to the second network device, the first network device sends the context of the terminal to the second network device according to the request of the second network device. This can improve resource utilization of the second network device, so that a handover success rate of another terminal can be increased.

With reference to any one of the first aspect or the first to the ninth possible implementations, in a eleventh possible implementation, the communication method may further include: receiving, by the first network device, a first notification message sent by the terminal, where the first notification message carries indication information of the to-be-handed-over-to cell; and sending, by the first network device based on the first notification message, data of the terminal and a sequence number status transfer message to a network device to which the to-be-handed-over-to cell belongs.

Based on the first notification message, the first network device stops allocating a PDCP sequence number to a data packet, and sends the sequence number status transfer message to the second network device. The data of the terminal may include an uplink data packet already sent by the terminal and a downlink data packet to which a sequence number has been allocated by the first network device but whose successful transmission to the terminal has not been acknowledged.

With reference to any one of the first aspect or the first to the ninth possible implementations, in an twelfth possible implementation, the communication method may further include: receiving, by the first network device, a request message sent by the second network device, where the request message is used to request a sequence number status transfer message of the terminal and data of the terminal, and in this case, the terminal has been handed over to a cell of the second network device; and sending, by the first network device, the sequence number status transfer message of the terminal and the data of the terminal to the second network device according to the request message.

According to the request message, the first network device stops allocating a PDCP sequence number to a data packet, and sends the sequence number status transfer message to the second network device. The data of the terminal may include an uplink data packet already sent by the terminal and a downlink data packet to which a sequence number has been allocated by the first network device but whose successful transmission to the terminal has not been acknowledged.

With reference to any one of the first aspect or the foregoing possible implementations, in a possible implementation, the first configuration information includes at least one of the following information: signal quality threshold information, fifth indication information, or sixth indication information, where the signal quality threshold information is used to trigger the terminal to determine the to-be-handed-over-to cell when a difference between signal quality of the serving cell and signal quality of a cell of the at least one candidate target cell is greater than or equal to a signal quality difference threshold, or when signal quality of the serving cell is less than a first signal quality threshold and signal quality of a cell of the at least one candidate target cell is greater than or equal to a second signal quality threshold; the fifth indication information is used to indicate transmission failure quantity threshold information, and the transmission failure quantity threshold information is used to trigger, after a transmission failure quantity of the terminal reaches a transmission failure quantity threshold, the terminal to perform the operation of determining the to-be-handed-over-to cell; and the sixth indication information is used to indicate a radio link failure event, and the radio link failure event is used to trigger, after a radio link of the terminal fails, the terminal to perform the operation of determining the to-be-handed-over-to cell.

According to a second aspect, this application provides a communication method, including: receiving, by a terminal, a first message sent by a first network device, where the first message includes first cell indication information and first configuration information, the first cell indication information is used to indicate at least one candidate target cell, the first configuration information is used to trigger the terminal to determine one of the at least one candidate target cell as a to-be-handed-over-to cell, and the first network device is a network device to which a serving cell currently accessed by the terminal belongs; and determining, by the terminal, the to-be-handed-over-to cell in the at least one candidate target cell based on the first message.

In the communication method, the terminal receives the first cell indication information and the first configuration information that are sent by the first network device, determines, based on the first message, whether the terminal needs to be handed over to the candidate target cell indicated by the first cell indication information, and determines a cell that is of the at least one candidate target cell and to which the terminal needs to be handed over. Then the terminal may be handed over to the cell. In this way, even if the terminal moves fast or there is an obstacle between the terminal and a source base station affecting signal quality between the terminal and the source base station or even if a high frequency system is concerned, the terminal can still be handed over to a target cell, so that a handover success rate of the terminal can be increased and communication quality of the terminal is improved.

With reference to the second aspect, in a first possible implementation, the first message further includes at least one of the following information: valid time of the first message, first indication information, or second configuration information, the first indication information is used to indicate a handover priority of the at least one candidate target cell, and the second configuration information is used by the terminal to cancel an operation of determining, based on the first message, the to-be-handed-over-to cell.

If the first message includes the valid time of the first message, the terminal may determine the to-be-handed-over-to cell based on the first message within the valid time, but does not determine the to-be-handed-over-to cell based on the first message when the valid time expires. In this way, resource utilization of the terminal can be improved.

If the first message includes the first indication information, the terminal determines the to-be-handed-over-to cell based on the first message by using the candidate target cell priority indicated by the first indication information. Specifically, the terminal may determine a candidate target cell with a high priority as the target handover cell. In this way, the terminal can determine a better to-be-handed-over-to cell, so that the terminal can increase the handover success rate.

If the first message includes the second configuration information, the terminal may determine, according to the second configuration information, that there is no need to determine the to-be-handed-over-to cell based on the first message. In this way, resource utilization of the terminal can be improved.

Specifically, the terminal may delete or discard the first message and various information in the first message.

With reference to the second aspect or the first possible implementation, in a second possible implementation, the first message may further include third configuration information, the third configuration information includes at least one of the following information: a first temporary identifier or information about a first RACH preamble, and the first temporary identifier and the information about the first dedicated RACH preamble are used by the terminal to access a cell that is of a second cell belonging to a second network device and that the terminal is allowed to access.

In this implementation, if the third configuration information includes the first temporary identifier, the terminal may be handed over to the second network device based on the first temporary identifier, so that a handover success rate of the terminal can be increased.

If the third configuration information includes the information about the first dedicated RACH preamble, the terminal may be handed over to the second network device based on the information about the first dedicated RACH preamble, so that the handover success rate of the terminal can be furthered increased.

The first dedicated RACH preamble or the first temporary identifier may be allocated by the second network device to the terminal, and may be used to access all or some cells that are of the second cell and that the terminal is allowed to access.

With reference to the second aspect or the first or the second possible implementation, in a third possible implementation, the communication method may further include: receiving, by the terminal, third indication information sent by the first network device, where the third indication information is used to indicate the terminal to cancel the operation of determining, based on the first message, the to-be-handed-over-to cell.

In this implementation, when determining that the terminal does not need to be handed over, the first network device may send the third indication information to the terminal, to indicate the terminal to cancel the operation of determining, based on the first message, the to-be-handed-over-to cell, in other words, indicate the terminal not to determine, based on the first message, the to-be-handed-over-to cell. In this way, a resource of the terminal can be saved, and the handover success rate of the terminal can be further increased.

Optionally, the third indication information may be carried in a radio resource control reconfiguration message, or an RRC reconfiguration message itself may implicitly indicate the terminal to cancel the operation of determining the to-be-handed-over-to cell.

Further, optionally, after the terminal cancels determining of the to-be-handed-over-to cell according to the indication of the RRC reconfiguration message, the terminal may further receive a new first message sent by the first network device.

It should be noted that if the first network device reconfigures only related information of the first network device on the terminal when reconfiguring the terminal, after receiving the RRC reconfiguration message, the terminal may not cancel determining of the to-be-handed-over-to cell, but update the related information of the first network device on the terminal.

With reference to any one of the second aspect or the first to the third possible implementations, in a fourth possible implementation, the communication method further includes: sending, by the terminal, fourth indication information to the first network device, where the fourth indication information is used to indicate the first network device to send the first message to the terminal. Correspondingly, the receiving, by a terminal, a first message sent by a first network device may include: receiving, by the terminal, the first message that is sent by the first network device according to the fourth indication information.

In this implementation, the terminal sends the fourth indication information to the first network device, so that the first network device may send the first message to the terminal according to the fourth indication information. In other words, when receiving no fourth indication information of the terminal, the first network device may make a handover decision based on a measurement report sent by the terminal, and control, by sending a handover message to the terminal, the terminal to perform handover. This implementation can improve handover flexibility of the terminal.

With reference to any one of the second aspect or the first to the fourth possible implementations, in a fifth possible implementation, the communication method may further include: sending, by the terminal, a first notification message to the first network device, where the first notification message carries indication information of the to-be-handed-over-to cell, so that the first network device sends, based on the first notification message, data of the terminal and a sequence number status transfer message to a network device to which the to-be-handed-over-to cell belongs.

With reference to any one of the second aspect or the foregoing possible implementations, in a possible implementation, the first configuration information includes at least one of the following information: signal quality threshold information, fifth indication information, or sixth indication information, where the signal quality threshold information is used to trigger the terminal to determine the to-be-handed-over-to cell when a difference between signal quality of the serving cell and signal quality of a cell of the at least one candidate target cell is greater than or equal to a signal quality difference threshold, or when signal quality of the serving cell is less than a first signal quality threshold and signal quality of a cell of the at least one candidate target cell is greater than or equal to a second signal quality threshold; the fifth indication information is used to indicate transmission failure quantity threshold information, and the transmission failure quantity threshold information is used to trigger, after a transmission failure quantity of the terminal reaches a transmission failure quantity threshold, the terminal to perform the operation of determining the to-be-handed-over-to cell; and the sixth indication information is used to indicate a radio link failure event, and the radio link failure event is used to trigger, after a radio link of the terminal fails, the terminal to perform the operation of determining the to-be-handed-over-to cell.

According to a third aspect, a network device is provided. The network device includes a module configured to perform the communication method according to any one of the first aspect or the possible implementations of the first aspect.

According to a fourth aspect, a terminal is provided. The terminal includes a module configured to perform the communication method according to any one of the second aspect or the possible implementations of the second aspect.

According to a fifth aspect, a network device is provided, including a processor and a transmitter. The processor is configured to execute code. When the code is executed, the processor and the transmitter implement the communication method according to any one of the first aspect or the possible implementations of the first aspect. Optionally, a receiver may be further included.

According to a sixth aspect, a terminal is provided, including a processor and a receiver. The processor is configured to execute code. When the code is executed, the processor and the receiver implement the communication method according to any one of the second aspect or the possible implementations of the second aspect. Optionally, a transmitter may be further included.

According to a seventh aspect, a computer readable medium is provided. The computer readable medium stores program code for execution by a network device, and the program code includes an instruction for performing the communication method according to any one of the first aspect or the possible implementations of the first aspect.

According to an eighth aspect, a computer readable medium is provided. The computer readable medium stores program code for execution by a terminal, and the program code includes an instruction for performing the communication method according to any one of the second aspect or the possible implementations of the second aspect.

According to a ninth aspect, a computer program product including an instruction is provided. When the computer program product is run on a network device, a network device is enabled to perform the communication method according to any one of the first aspect or the possible implementations of the first aspect.

According to a tenth aspect, a computer program product including an instruction is provided. When the computer program product is run on a terminal, a terminal is enabled to perform the communication method according to any one of the second aspect or the possible implementations of the second aspect.

According to an eleventh aspect, a communication method is provided. The communication method includes: receiving, by a second network device, a second message sent by a first network device, where the second message includes a context of a terminal and valid time of the context.

Optionally, the second network device may release the context after the valid time of the context expires. Optionally, the valid time may be valid time of a temporary identifier or a dedicated RACH preamble allocated by the second network device to the terminal. If the valid time expires, the second network device may release the temporary identifier or the dedicated RACH preamble.

Optionally, the second network device may receive second indication information sent by the first network device, and release, according to the second indication information, the context of the terminal or a temporary identifier or a dedicated RACH preamble allocated to the terminal.

Alternatively, after receiving a new second message, the second network device may release the context of the terminal or even the valid time of the context included in the previous second message, or release a temporary identifier or a dedicated RACH preamble allocated to the terminal.

The technical feature of the second network device in the first aspect or the second aspect is applicable to the second network device in the eleventh aspect. For brevity, details are not described herein again.

According to a twelfth aspect, a network device is provided. The network device includes a module configured to perform the communication method according to any one of the eleventh aspect or the possible implementations of the eleventh aspect.

According to a thirteenth aspect, a network device is provided, including a processor and a receiver. The processor is configured to execute code. When the code is executed, the processor and the receiver implement the communication method according to any one of the first aspect or the possible implementations of the first aspect. Optionally, a transmitter may be further included.

According to a fourteenth aspect, a computer readable medium is provided. The computer readable medium stores program code for execution by a network device, and the program code includes an instruction for performing the communication method according to any one of the eleventh aspect or the possible implementations of the eleventh aspect.

According to a fifteenth aspect, a computer program product including an instruction is provided. When the computer program product is run on a terminal, a network device is enabled to perform the communication method according to any one of the eleventh aspect or the possible implementations of the eleventh aspect.

DETAILED DESCRIPTION OF ILLUSTRATIVE EMBODIMENTS

Figure 1:
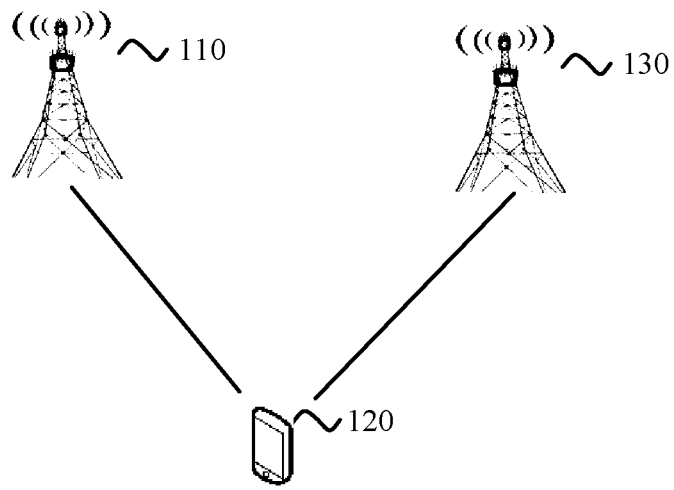
FIG. 1 is a schematic architectural diagram of a communications system to which a communication method, a network device, and a terminal according to embodiments of this application can be applied.

FIG. 1 is a schematic architectural diagram of a communications system to which a communication method, a terminal, and a network device according to the embodiments of this application can be applied. It should be understood that the embodiments of this application are not limited to a system architecture shown in FIG. 1. In addition, apparatuses in FIG. 1 may be hardware, or software obtained through functional division, or a combination thereof.

It can be learned from FIG. 1 that the communications system to which the communication method according to the embodiments of this application can be applied may include a network device 110, a terminal 120, and a network device 130. A network device to which a cell currently accessed by the terminal 120 belongs is the network device 110. The terminal 120 may be handed over to a cell of the network device 130 under some circumstances. Usually, handover of the terminal 120 to a cell of the network device may also be referred to as handover of the terminal 120 to the network device 130.

An example of the network device 11o and the network device 130 is a base station. It should be understood that a specific type of the base station is not limited in the embodiments of this application. In systems using different radio access technologies, devices with a base station function may have different names. For ease of description, in all the embodiments of this application, the apparatuses providing a wireless communication function for the terminal are collectively referred to as a base station, for example, a base station device in a future network or a small cell device (pico).

The terminal 120 may be user equipment (UE). The UE may communicate with one or more core networks (CN) via a radio access network (RAN). The UE may be referred to as an access terminal, a terminal device, a subscriber unit, a subscriber station, a mobile station, a remote station, a remote terminal, a mobile device, a user terminal, a wireless network device, a user agent, or a user apparatus. The UE may be a cellular phone, a cordless phone, a session initiation protocol (SIP) phone, a wireless local loop (WLL) station, personal digital assistant (PDA), a handheld device having a wireless communication function, a computing device, another device connected to a wireless modem, a vehicle-mounted device, a wearable device, a terminal device on Internet of Things or Internet of vehicles, or a terminal device in any form in a future network, or the like.

Figure 2:
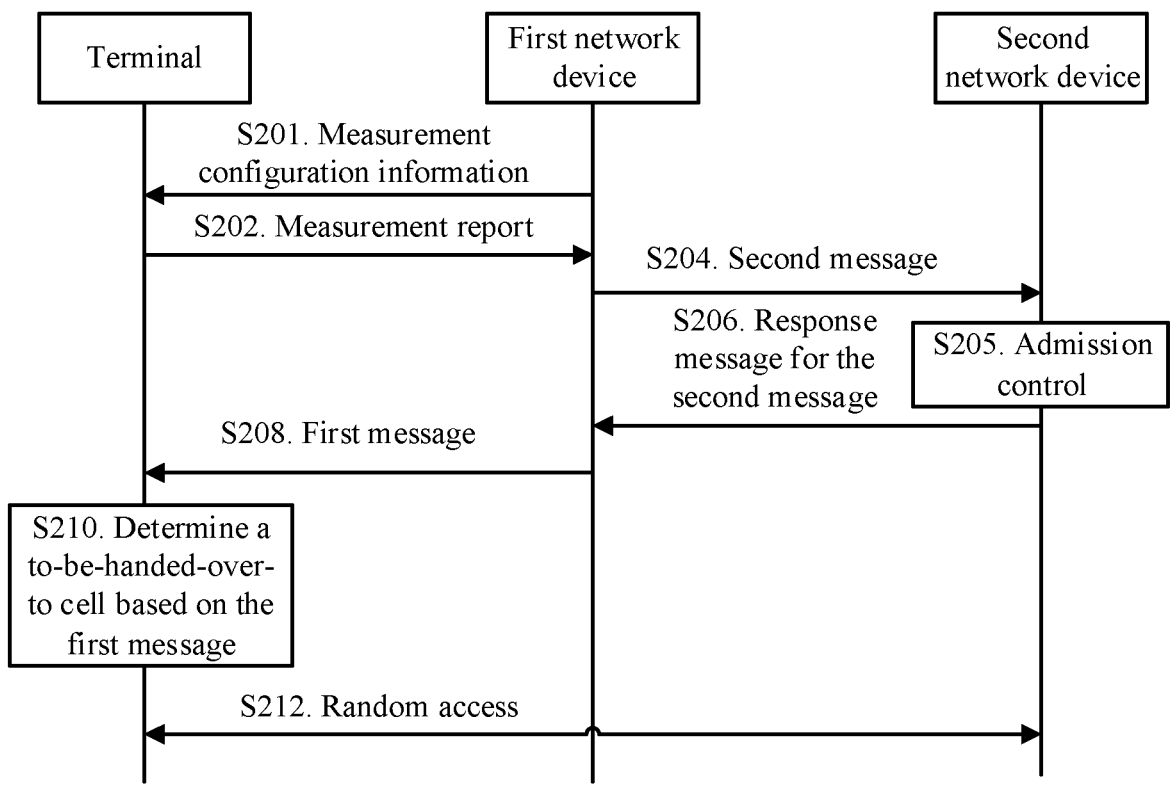
FIG. 2 is a schematic flowchart of a communication method according to an embodiment of this application.

FIG. 2 is a schematic flowchart of a communication method according to an embodiment of this application. It should be understood that although FIG. 2 shows steps or operations of the communication method, these steps or operations are merely examples. Other operations or variations of the operations in FIG. 2 may also be performed in this embodiment of this application. In addition, the steps in FIG. 2 may be performed in an order different from that shown in FIG. 2, and not all the operations in FIG. 2 may need to be performed.

S201. A first network device sends measurement configuration information to a terminal. Correspondingly, the terminal receives the measurement configuration information.

The first network device is a network device to which a cell currently serving the terminal (referred to as a source cell in this embodiment of this application) belongs. The first network device may be the network device 110 in the communications system shown in FIG. 1. Usually, the first network device may also be referred to as a source base station.

The measurement configuration information may include a measurement object, a measurement ID (measurement identity), a report configuration, a measurement gap, and the like.

S202. After performing measurement based on the measurement configuration information, the terminal reports a measurement report to the first network device.

Correspondingly, the first network device receives the measurement report.

Specifically, the measurement report may include signal quality of a measured cell, an identifier of the measured cell, and the like.

S204. After receiving the measurement report, the first network device determines one or more candidate cells.

For example, the first network device may determine, based on the signal quality of the measured cell, whether conditional handover is required for the terminal. After determining that conditional handover is required for the terminal, the first network device may screen a cell indicated by information in the measurement report reported by the terminal, to determine the one or more candidate cells. For example, the first network device may determine, as the one or more candidate cells, a cell with relatively good signal quality of the cell indicated by the information in the measurement report. It should be noted that the screening step herein is optional, and may not be performed.

It should be noted that the first network device may alternatively determine the one or more candidate cells in another manner. Examples are not described one by one for description in this embodiment of this application. The one or more candidate cells determined herein may be directly used as a candidate target cell, in other words, step S205 does not need to be performed. In addition, a candidate target cell may be obtained from the determined one or more candidate cells through further determining, for example, performing step S205.

It may be understood that the conditional handover herein means that the first network device preliminarily determines that the terminal may need to be handed over to another cell, and sends a first message to the terminal, so that the terminal further determines whether handover is needed and determines a to-be-handed-over-to cell.

Based on the foregoing determined one or more candidate cells, the first network device may send a second message to a network device (referred to as a second network device in this embodiment of this application) to which the one or more candidate cells belong. Correspondingly, the second network device receives the second message.

The second message may carry indication information of a second cell, and the indication information of the second cell is used to indicate a cell, determined by the first network device, belonging to the second network device. Specifically, the indication information of the second cell may carry an identifier or an index of the cell, determined by the first network device, belonging to the second network device.

The second message may be a handover request message or another message. This is not limited in this embodiment of this application.

The second message may carry indication information used to indicate that the second message is a handover request message for a case in which the terminal determines the to-be-handed-over-to cell, so that the second network device may perform a corresponding operation based on the handover request message. Specifically, the indication information may be represented by using a binary bit "0" or "1", or may be represented by using a Boolean value or an information element.

If the first network device determines a plurality of candidate cells in step S204, and the plurality of candidate cells belong to a plurality of second network devices, the first network device sends the second message to each of the plurality of second network devices. Each second message may carry information about a candidate cell belonging to a second network device corresponding to the second message. Specifically, the information about the candidate cell may be an identifier or an index of the candidate cell.

Optionally, the second message may further carry a context of the terminal, for example, a cell radio network temporary identifier (C-RNTI) of the source cell, an access stratum (AS) configuration, a bearer context, or a physical cell identifier (PCI) or message authentication code for integrity (MAC-I) of the source cell.

Optionally, the second message may further carry valid time. The valid time may be implemented by using a timer as valid time of the context, so that after the timer of the valid time of the context expires, the second network device may delete the context. In this way, the second network device can have more resources to serve another terminal, so that a handover success rate of the another terminal can be increased.

S205. After receiving the second message, the second network device performs an admission control process.

The admission control process may include: The second network device determines, based on a network resource status such as load of the second cell, a cell that is of the second cell and that the terminal is allowed to access, and the second network device may use, as the candidate target cell of the terminal, the candidate cell that is of the second cell and that the terminal is allowed to access.

In addition, the second network device may allocate, to the terminal, resources used to access the candidate target cell of the second network device, for example, a temporary identifier (for example, a C-RNTI) and/or a dedicated RACH preamble.

In this case, if the to-be-handed-over-to cell determined by the terminal is the cell to which the dedicated RACH preamble is allocated, when accessing the to-be-handed-over-to cell, the terminal may perform a random access procedure with the to-be-handed-over-to cell by using information about the dedicated RACH preamble.

It should be understood that the valid time carried in the second message may not only be used for the context, but also may be used as valid time of the temporary identifier and/or the dedicated RACH preamble. To be specific, when the valid time expires, the second network device may release the temporary identifier and/or the dedicated RACH preamble.

S206. The second network device sends a response message for the second message to the first network device.

Correspondingly, the first network device receives the response message for the second message.

The response message may carry third cell indication information, and the third cell indication information is used to indicate a cell that is of the second network device and that the terminal is allowed to access. The third cell indication information may indicate one or more cells. The third cell indication information may specifically include an identifier or an index of the cell that is of the second network device and that the terminal is allowed to access.

Optionally, the response message may further carry a temporary identifier, allocated by the second network device to the terminal, used to access each of all cells or some cells indicated by the third cell indication information.

Optionally, the response message may further carry information about a dedicated RACH preamble, allocated by the second network device to the terminal, used to access each of all cells or some cells indicated by the third cell indication information.

The temporary identifier and the information about the dedicated RACH preamble may be collectively referred to as third configuration information.

If the first network device sends the second message to a plurality of second network devices in step S204, the first network device may receive a response message for the second message sent by each of the plurality of second network devices.

The response message for the second message may be a handover request acknowledgment (handover request ACK) message or another message. This is not limited in this embodiment of this application.

After receiving the response message for the second message, the first network device may determine at least one candidate target cell and first configuration information that are used by the terminal to determine the to-be-handed-over-to cell. The to-be-handed-over-to cell is determined by the terminal in the at least one candidate target cell, and the first network device is the network device to which the cell currently accessed by the terminal belongs.

The to-be-handed-over-to cell is a cell to which the terminal is to be handed over from the source cell. The first network device may determine the at least one candidate target cell based on the response message sent by one or more second network devices. For example, after receiving the response message sent by the second network device, the first network device may obtain cell indication information that is in the response message and that is used to indicate the cell that the second network device allows the terminal to access, so that the candidate target cell of the terminal may be determined based on indication of the cell indication information.

The first configuration information may include signal quality threshold information. For example, the first configuration information may include X dB. When the terminal determines that a difference between signal quality of a cell of the candidate target cell and signal quality of the serving cell is greater than or equal to X dB, the terminal is triggered to determine the cell as the to-be-handed-over-to cell.

Alternatively, the first configuration information may include Y dB and Z dB. In this case, when the terminal determines that signal quality of the serving cell is lower than Y dB and signal quality of a cell of the candidate target cell is higher than Z dB, the terminal is triggered to determine the cell as the to-be-handed-over-to cell, where X, Y, and Z are positive numbers.

Optionally, the first configuration information may further include other information, for example, fifth indication information used to indicate a transmission failure quantity threshold. In this case, when a transmission failure quantity of the terminal reaches a transmission failure quantity threshold, the terminal is triggered to perform an operation of determining the to-be-handed-over-to cell.

Optionally, the first configuration information may further include sixth indication information used to indicate a radio link failure (RLF) event. When a radio link of the terminal fails, the terminal is triggered to perform an operation of determining the to-be-handed-over-to cell.

It may be understood that when the first configuration information includes a plurality of pieces of indication information, any configuration event in the plurality of pieces of indication information may trigger the terminal to determine one of the at least one candidate target cell as the to-be-handed-over-to cell, or a plurality of configuration events may trigger the terminal to determine one of the at least one candidate target cell as the to-be-handed-over-to cell. This is not limited in this embodiment of this application.

It should be understood that when the second network device determines that none of the second cell is allowed for access by the terminal, the response message for the second message may be used to notify the first network device of a cell acknowledgment failure. After receiving the response message for the second message, the first network device does not send the first message to the terminal.

S208. The first network device sends the first message to the terminal, where the first message includes first cell indication information and the first configuration information, and the first cell indication information is used to indicate the at least one candidate target cell.

Correspondingly, the terminal receives the first message.

That is, after determining the at least one candidate target cell and the first configuration information, the first network device may send, to the terminal, the first message that carries the first configuration information and the first cell indication information.

The first cell indication information may include an identifier or an index of the at least one candidate target cell. Optionally, the first cell indication information may include an identifier list or an index list of the at least one candidate target cell.

The first message may be a handover message, to be specific, an RRC connection reconfiguration message carrying a mobilityControlInfo information element, or may be another message. This is not limited in this embodiment of this application.

The terminal may determine a function of the first message based on parsed-out content of the first message. Alternatively, the first message may include indication information used to indicate a type or a function of the message.

S210. After receiving the first message, the terminal may determine the to-be-handed-over-to cell based on the first message.

Specifically, the terminal may determine, based on the first cell indication information, one of the at least one candidate target cell as the to-be-handed-over-to cell of the terminal.

An exemplary implementation of determining, by the terminal, the to-be-handed-over-to cell includes: detecting, by the terminal, whether signal quality of each candidate target cell meets one or more conditions indicated by configuration information, of the candidate target cell, in the first configuration information, and determining a candidate target cell that meets the one or more conditions as the to-be-handed-over-to cell.

For example, if a candidate target cell list includes a candidate target cell 1, and the first configuration information includes 30 dB, when a difference between signal quality of the candidate target cell 1 and signal quality of the serving cell is greater than or equal to 30 dB, the terminal is triggered to determine the candidate target cell 1 as the to-be-handed-over-to cell.

If the terminal determines a plurality of cells in the candidate target cell based on the first message, the terminal may determine a cell with best signal quality as the to-be-handed-over-to cell.

Optionally, the first message sent by the first network device to the terminal may further include first indication information, and the first indication information is used to indicate a handover priority of the at least one candidate target cell. The first indication information may be explicit or implicit. For example, the first cell indication information implicitly carries a handover priority of each candidate target cell. For example, a candidate target cell coming first in the first cell indication information has a highest priority. Alternatively, the first indication information is bound to the first cell indication information, in other words, each candidate target cell in the first cell indication information has a corresponding handover priority. The terminal may determine the to-be-handed-over-to cell based on the candidate target cell priority. Specifically, the terminal may sequentially determine, based on the first configuration information and in descending order of priorities, whether a cell of the candidate target cell may be used as the to-be-handed-over-to cell, until one to-be-handed-over-to cell is obtained. In this way, a handover success rate of the terminal can be increased.

It should be noted that the candidate target cell priority may be indicated by a ranking order in the identifier list or index list of the candidate target cell indicated by the first cell indication information. For example, a candidate target cell with higher ranking has a higher priority.

Optionally, the first message sent by the first network device to the terminal may further include valid time of the first message. The valid time may be used as valid time of various information in the first message.

After the valid time or a valid period expires, the terminal may cancel the operation of determining, based on the first message, the to-be-handed-over-to cell, in other words, the terminal may not determine the to-be-handed-over-to cell based on the first message. Specifically, the terminal may delete the first message and the various information in the first message.

Optionally, the first message sent by the first network device to the terminal may further include second configuration information. The second configuration information is used to indicate the terminal to cancel the operation of determining, based on the first message, the to-be-handed-over-to cell. After receiving the second configuration information, if the terminal determines that condition(s) indicated by the second configuration information is met, the terminal may not determine the to-be-handed-over-to cell in the at least one candidate target cell based on the first message.

For example, the second configuration information may be a signal quality threshold, for example, 80 dB. In this case, when signal quality of the serving cell is greater than 80 dB, the terminal is triggered to cancel the operation of determining, based on the first message, the to-be-handed-over-to cell in the candidate target cell. In other words, the terminal may not determine the to-be-handed-over-to cell in the candidate target cell based on the first message.

If the response message sent by the second network device to the first network device in step S206 includes the third configuration information, the first message sent by the first network device to the terminal may also include the third configuration information.

S212. After determining the to-be-handed-over-to cell, the terminal may initiate a random access procedure to a second network device to which the to-be-handed-over-to cell belongs, to access the to-be-handed-over-to cell.

If the first message sent by the first network device to the terminal includes the third configuration information, the terminal may access the to-be-handed-over-to cell based on the third configuration information. In this way, the handover success rate of the terminal can be further increased.

Specifically, if the third configuration information includes the temporary identifier, allocated by the second network device to the terminal, used to access the cell that is of the second network device and that the terminal is allowed to access, the terminal may use the temporary identifier to access the to-be-handed-over-to cell. Alternatively, if the third configuration information includes the information about the dedicated RACH preamble, allocated by the second network device to the terminal, used to access the cell that is of the second network device and that the terminal is allowed to access, the terminal may perform the random access procedure with the to-be-handed-over-to cell by using the information about the dedicated RACH preamble.

Optionally, after the terminal determines the to-be-handed-over-to cell, the first network device may stop allocating a sequence number to a data packet of the terminal, and send a data packet of the terminal and a sequence number status transfer (SN status transfer) message to the second network device. The sequence number status transfer message may indicate, to the second network device, a start count (COUNT) value used for allocating a sequence number to a downlink data packet to which a sequence number is not allocated yet (in other words, a count value from which the second network device starts to allocate a sequence number to a downlink data packet of the terminal).

The data packet of the terminal includes an uplink data packet of the terminal or a downlink data packet to which a sequence number has been allocated but whose successful transmission to the terminal has not been acknowledged.

Two exemplary implementations of sending, by the first network device, the data packet of the terminal and the sequence number status transfer message to the second network device are as follows.

In one exemplary implementation, after completing random access, the terminal may send a handover complete message to the second network device. The handover complete message is used to notify the second network device that the terminal has completed access. Correspondingly, the second network device receives the handover complete message.

After receiving the handover complete message, the second network device may send a first request message to the first network device, to request the SN status transfer message for the terminal. Correspondingly, the first network device receives the first request message.

After receiving the first request message, the first network device stops allocating a packet data convergence protocol (PDCP) sequence number to the data packet of the terminal, and sends the SN status transfer message to the second network device. In addition, the first network device may further forward a received uplink data packet of the terminal to the second network device, and forward, to the second network device, a downlink data packet to which a PDCP sequence number has been allocated but whose successful transmission to the terminal has not been acknowledged.

If the handover request message sent by the first network device in step S204 does not carry the context of the terminal, after receiving the handover complete message, the second network device may send a second request message to the first network device. The second request message is used to request the context of the terminal. After receiving the second request message of the second network device, the first network device sends the context of the terminal to the second network device. The second request message and the first request message may be a same message.

In another implementation, after determining the to-be-handed-over-to cell, the terminal may send a first notification message to the first network device, to notify the first network device that the terminal is to be handed over to the to-be-handed-over-to cell. The first notification message may specifically carry indication information used to indicate the to-be-handed-over-to cell, for example, an identifier or an index value.

After receiving the first notification message, the first network device may stop allocating a PDCP sequence number to the data packet of the terminal, and send the SN status transfer message to the second network device. In addition, the first network device may further forward a received uplink data packet of the terminal to the second network device, and forward, to the second network device, a downlink data packet to which a PDCP sequence number has been allocated but whose successful transmission to the terminal has not been acknowledged.

In this embodiment of this application, optionally, before the first network device sends the first message to the terminal, the terminal may send fourth indication information to the first network device, where the fourth indication information is used to indicate the first network device to send the first message to the terminal. Correspondingly, the sending, by the first network device, the first message to the terminal may specifically include: sending, by the first network device, the first message to the terminal according to the fourth indication information.

In other words, the first network device may send the first message upon only a request or instruction of the terminal. In this way, communication efficiency can be improved.

Specifically, the fourth indication information may be sent by using an RRC message.

It should be noted that in this embodiment of this application, step S201 to step S206 are optional. To be specific, the communication method shown in FIG. 2 may not include step S201 to step S206 or may include only some steps of step S201 to step S206.

For example, this embodiment of this application may not include step S201 to step S206. In this case, the first network device may determine the at least one candidate target cell according to another manner. For example, a neighboring cell of the serving cell may be determined as the candidate target cell.

For another example, this embodiment of this application may not include step S205 to step S206. In this case, after determining the one or more candidate cells based on the measurement report of the terminal, the first network device may determine the one or more candidate cells as candidate target cells. In addition, the first network device does not send the third configuration information to the terminal.

In this case, after the terminal is successfully handed over to the to-be-handed-over-to cell, the handover complete message sent to the second network device may include, for example, the C-RNTI of the source cell, or the MAC-I or PCI of the source cell.

For another example, this embodiment of this application may not include step S205. In other words, after receiving the second message, the second network device may not perform admission control. In this case, the response message for the second message sent by the second network device carries neither the third configuration information nor the indication information of the cell that is of the second network device and that the terminal is allowed to access. In this case, the response message may be used only to notify the first network device that the second network device has received the second message and the information carried in the second message, for example, information about the context of the terminal received and stored by the second network device.

Figure 3:
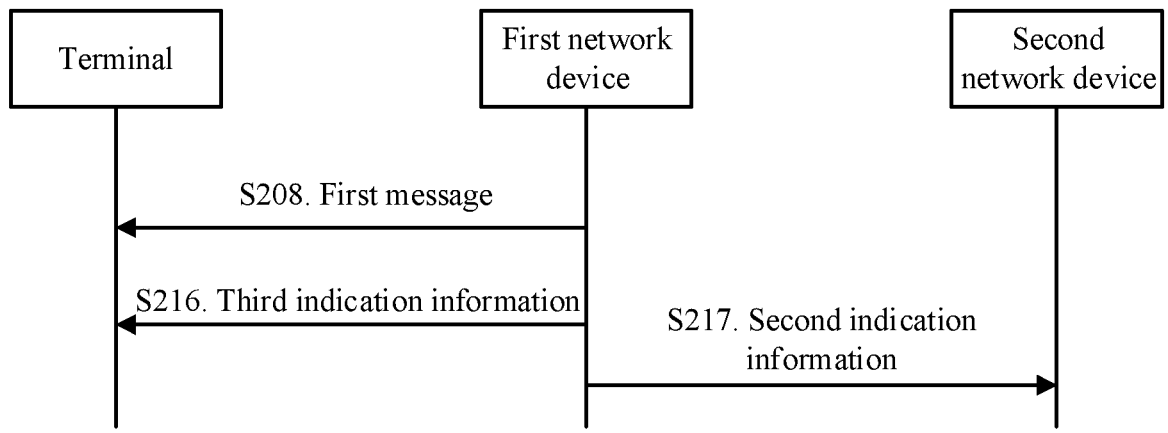
FIG. 3 is a schematic flowchart of a communication method according to another embodiment of this application.

FIG. 3 is a schematic flowchart of a communication method according to another embodiment of this application. It should be understood that although FIG. 3 shows steps or operations of the communication method, these steps or operations are merely examples. Other operations or variations of the operations in FIG. 3 may also be performed in this embodiment of this application. In addition, the steps in FIG. 3 may be performed in an order different from that shown in FIG. 3.

FIG. 3 may include step S208 in FIG. 2 and all or some of step S201 to step S206. For brevity, technical features of the corresponding steps are not described herein again.

S216. When determining that the terminal does not need to be handed over to another cell, the first network device indicates the terminal to cancel the operation of determining, based on the first message, the to-be-handed-over-to cell.

For example, the first network device may send third indication information to the terminal. The third indication information is used to indicate the terminal to cancel the operation of determining, based on the first message, the to-be-handed-over-to cell. In other words, the terminal may not determine the to-be-handed-over-to cell in the candidate target cell based on the first message.

Correspondingly, after receiving the third indication information, the terminal may cancel the operation of determining, based on the first message, the to-be-handed-over-to cell. In other words, the terminal may not determine the to-be-handed-over-to cell in the candidate target cell based on the first message.

Optionally, the first network device may alternatively perform notification by using a handover message. For example, before the terminal determines the to-be-handed-over-to cell, if the first network device sends a handover message to the terminal, after receiving the handover message, the terminal may not perform the operation of determining, based on the first message, the to-be-handed-over-to cell, may discard related information in the first message, and perform a corresponding operation according to the handover command. It should be noted that the handover message herein is with regard to the conditional handover in this embodiment of this application. For example, the handover message is an RRC connection reconfiguration message that carries a mobilityControlInfo information element. Usually, the handover message may include an identifier or an index, a C-RNTI or a RACH preamble, or the like of the to-be-handed-over-to cell.

Optionally, the first network device may instruct, by sending a new first message, the terminal to cancel the operation of determining, based on the previous first message, the to-be-handed-over-to cell. In this case, the terminal may perform an operation of determining, based on the new first message, the to-be-handed-over-to cell.

Optionally, the communication method shown in FIG. 3 may further include step S217: The first network device sends second indication information to the second network device, where the second indication information is used to indicate the second network device to release a resource allocated by the second network device to the terminal and/or release the context of the terminal. In this way, the second network device can have more resources to be allocated to another terminal, so that a handover success rate of the another terminal can be increased.

For example, if the communication method shown in FIG. 3 includes step S204, and the second message sent by the first network device in step S204 carries the context of the terminal, after receiving the second indication information, the second network device may release the context of the terminal according to the second indication information.

For another example, if the communication method shown in FIG. 3 includes step S205, and the second network device allocates the temporary identifier and/or the dedicated RACH preamble to the terminal in step S205, after receiving the second indication information, the second network device may release, according to the second indication information, the temporary identifier and/or the dedicated RACH preamble allocated to the terminal.

In this embodiment of this application, optionally, the first network device may send the second indication information to the second network device after determining that the terminal does not need to be handed over to another cell.

Alternatively, after canceling the operation of determining, based on the first message, the to-be-handed-over-to cell according to the third indication information sent by the first network device, the terminal sends a cancel complete notification message to the first network device. After receiving the cancel complete notification message sent by the terminal, the first network device sends the second indication information to the second network device. Alternatively, the first network device may send the second indication information to the second network device when sending the handover message to the terminal.

Alternatively, the first network device may indicate, by sending a new second message to the second network device, the second network device to release information transmitted by using the previous second message, or release the temporary identifier or dedicated RACH preamble that is allocated to the terminal based on the previous second message.

Figure 4:
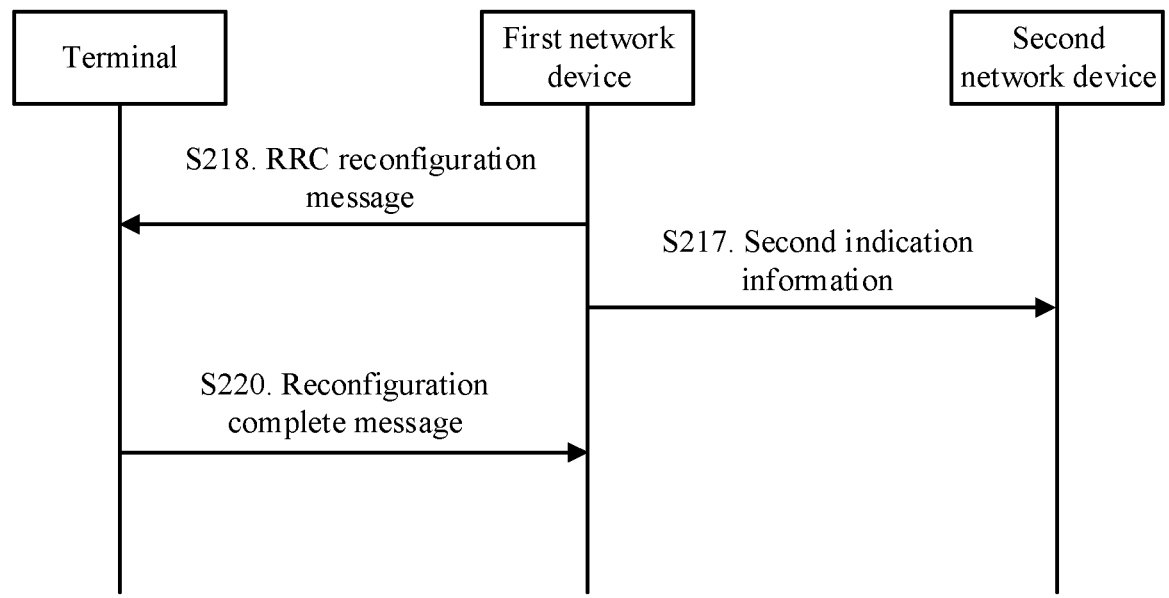
FIG. 4 is a schematic flowchart of a communication method according to another embodiment of this application.

In the communication method shown in FIG. 2, optionally, after the terminal receives the first message but before the terminal determines and obtains the to-be-handed-over-to cell based on the first message, steps shown in FIG. 4 may be further included.

It should be understood that the steps or operations shown in FIG. 4 are merely examples. Other operations or variations of the operations in FIG. 4 may also be performed in this embodiment of this application. In addition, the steps in FIG. 4 may be performed in an order different from that shown in FIG. 4.

S218. The first network device sends an RRC reconfiguration message to the terminal. Correspondingly, the terminal receives the RRC reconfiguration message.

Specifically, after determining that the terminal needs to be reconfigured, the first network device may send the RRC reconfiguration message to the terminal.

After receiving the RRC reconfiguration message, the terminal may cancel the operation of determining, based on the first message, the to-be-handed-over-to cell, in other words, the terminal may not determine, based on the first message, the to-be-handed-over-to cell in the candidate target cell indicated by the first cell indication information.

In other words, the RRC reconfiguration message may be used to indicate the terminal to cancel the operation of determining, based on the first message, the to-be-handed-over-to cell. Certainly, the RRC reconfiguration message may also carry indication information specifically used to indicate the terminal to cancel the operation of determining, based on the first message, the to-be-handed-over-to cell.

It should be noted that if the RRC reconfiguration message instructs the terminal only to change a configuration of the source cell, the terminal may not cancel the operation of determining, based on the first message, the to-be-handed-over-to cell, but only reconfigure the source cell, and configuration information of the candidate target cell remains unchanged.

S220. After completing reconfiguration according to the RRC reconfiguration message, the terminal may send a reconfiguration complete message to the first network device. Correspondingly, the first network device receives the reconfiguration complete message.

After receiving the reconfiguration complete message, the first network device may determine at least one new candidate target cell, and send a new first message to the terminal. The new first message may include new first cell indication information and new first configuration information. The new first cell indication information is used to indicate the determined at least one new candidate target cell. The new first message may further include other technical features that may be included in the previous first message. For brevity, details are not described herein again.

After receiving the new first message, the terminal may perform step S21o based on the new first message.

In addition, after receiving the reconfiguration complete message, the first network device may send a new handover request message to the second network device. The new handover request message may include a new context of the terminal. The second network device may update the originally stored context to the new context. Alternatively, the second network device may release the resource previously allocated to the terminal, for example, the temporary identifier or the dedicated RACH preamble, and allocate a new resource to the terminal, for example, a new temporary identifier or a new dedicated RACH preamble. A new handover message may include other technical features that may be included in the previous handover message. For brevity, details are not described herein again.

In the communication method shown in FIG. 4, optionally, before or after sending the RRC reconfiguration message to the terminal, the first network device may perform step S217, in other words, the first network device may send second indication information to the second network device. The second indication information is used to indicate the second network device to release the terminal context that is received by the second network device before step S217, or used to indicate the second network device to release the resource that is allocated to the terminal by the second network device before step S217, for example, the temporary identifier or the dedicated RACH preamble.

In other words, in this implementation, after receiving the second indication information, the second network device may release the previously received context of the terminal, or release the resource previously allocated to the terminal. After the first network device sends a new second message, the second network device may directly store a context of the terminal in the new second message, or directly allocate a resource to the terminal.

After reconfiguring the terminal, the first network device may use a delta signaling manner, in other words, send only an updated part of a configuration to the second network device, or may use a full configuration manner, in other words, send an entire updated configuration to the second network device, to update the context of the terminal on the second network device.

Optionally, when the second message sent by the first network device to the second network device includes the indication information used to indicate the second cell of the second network device, the second message may further include a measurement result and an identifier of one or more cells of another network device. After receiving the second message, the second network device may ensure, based on the measurement result of the cell of the another network device, that the terminal can perform a dual connectivity (DC) procedure with the second network device and the another network device after the terminal is handed over to the second network device. The another network device may be understood as a secondary network device.

In this case, the second network device may perform a secondary-network-device addition procedure with the secondary network device, to exchange a DC configuration. Specifically, the secondary network device generates the DC configuration information and sends the DC configuration information to the second network device. Then the second network device may carry the DC configuration information in the response message for the second message. Finally, the first network device may carry the DC configuration information in the first message.

In a possible implementation, to implement zero millisecond interruption in a handover process, the handover command or the first message in this embodiment of this application may carry indication information used to indicate that in the handover process, the terminal needs to implement zero millisecond interruption, or maintain data transmission with the first network device until handover is completed or until an indication from a network device is received. After receiving the indication, the terminal may establish a protocol stack shown in FIG. 5 or FIG. 6.

Figure 5:
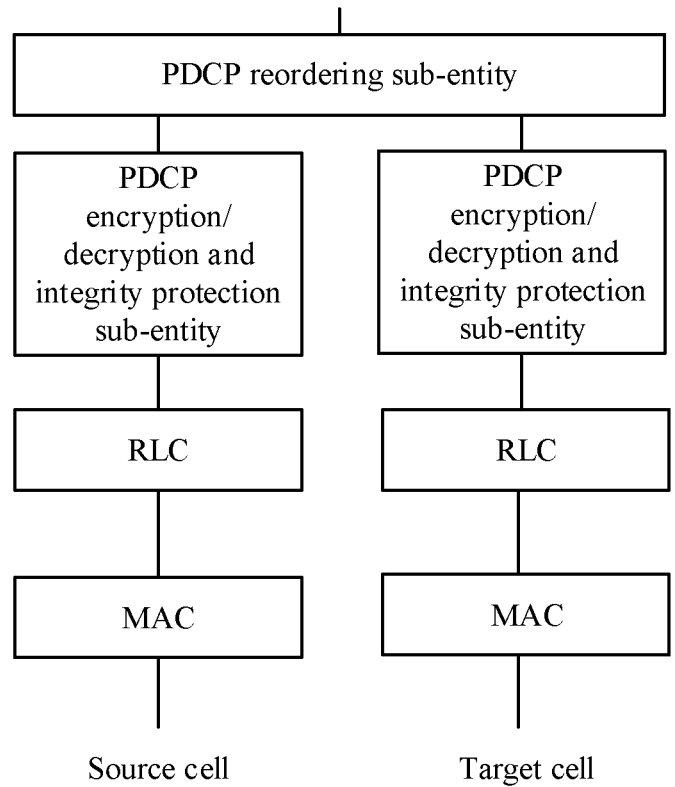
FIG. 5 is a schematic diagram of a protocol stack of a terminal according to an embodiment of this application.

As shown in FIG. 5, the terminal establishes a medium access control (MAC) entity, a radio link control (RLC) entity, and a packet data convergence protocol (PDCP) sub-entity that are corresponding to each of the source cell and a target cell (in other words, the to-be-handed-over-to cell in the foregoing embodiment). The PDCP sub-entity is used for data encryption/decryption and integrity protection. However, the terminal establishes only one PDCP reordering sub-entity used to allocate an SN number to a data packet to sequentially deliver PDCP packets, in other words, ensure that data packets are sequentially sent and reordered.

Figure 6:
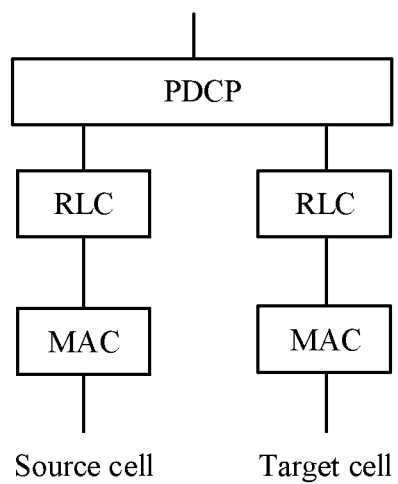
FIG. 6 is a schematic diagram of a protocol stack of a terminal according to another embodiment of this application.

As shown in FIG. 6, the terminal establishes a MAC entity and an RLC entity that are corresponding to each of the source cell and a target cell, but establishes only one PDCP entity for data encryption/decryption, integrity protection, and SN number allocation for sequential delivery. The terminal may store two security keys (corresponding to the source cell and the target cell). The terminal uses a correct key to perform data encryption/decryption and integrity protection in a corresponding cell. For example, the terminal uses a key corresponding to the source cell for data transmission in the source cell, and uses a key corresponding to the target cell for data transmission in the target cell.

Optionally, after receiving the first message or the handover message, the terminal may start a timer. The timer may be specified by a protocol, preconfigured by the terminal, or indicated by the first message or the handover message. After the timer expires, the terminal may release a protocol stack of the source cell. To be specific, the terminal may release the entities in the protocol stack of the source cell.

Alternatively, the terminal may release the protocol stack of the source cell after handover is completed, for example, releasing the protocol stack of the source cell after sending the handover complete message.

Alternatively, the terminal releases the protocol stack of the source cell only when the terminal is instructed to do so by a network side. For example, if the first network device determines that data that needs to be transmitted in the source cell is all transmitted or the source cell is no longer used for data transmission, the first network device may send an indication message to the terminal. After receiving the indication message, the terminal may release the protocol stack of the source cell. For another example, after receiving the handover complete message of the terminal, the second network device may send an indication message to the terminal. After receiving the indication message, the terminal releases the protocol stack of the source cell.

Figure 7:
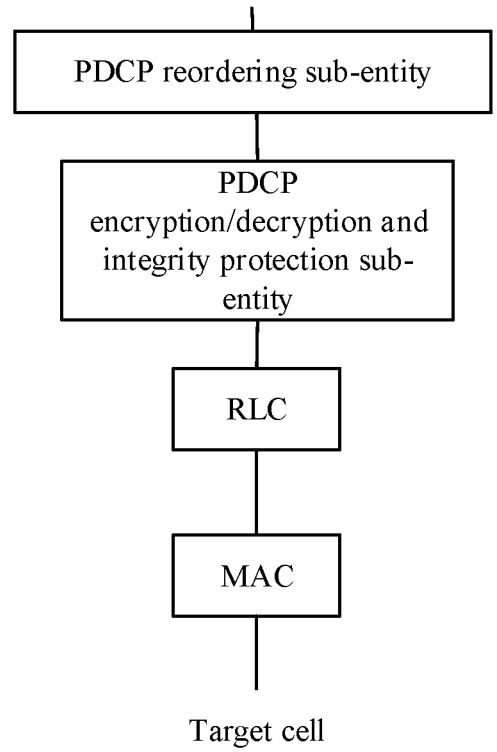
FIG. 7 is a schematic diagram of a protocol stack of a terminal after the terminal releases the protocol stack of the source cell according to an embodiment of this application.
Figure 8:
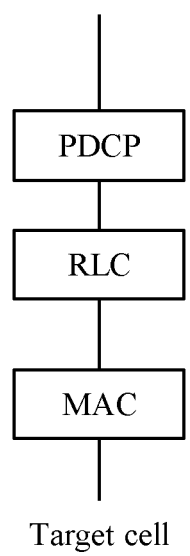
FIG. 8 is a schematic diagram of a protocol stack of a terminal after the terminal releases the protocol stack of the source cell according to another embodiment of this application.

When the protocol stack of the terminal is as that shown in FIG. 5, after the terminal releases the protocol stack of the source cell, a protocol stack of the terminal is shown in FIG. 7. When the protocol stack of the terminal is as that shown in FIG. 6, after the terminal releases the protocol stack of the source cell, a protocol stack of the terminal is shown in FIG. 8.

Figure 9:
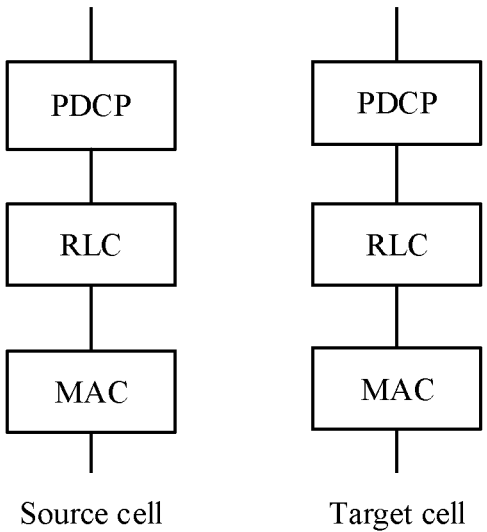
FIG. 9 is a schematic diagram of a network side protocol stack according to an embodiment of this application.

Optionally, the first network device may carry indication information in the handover request message or the second message, and the indication information is used to indicate to the second network device that zero millisecond interruption needs to be implemented in the handover process of the terminal. A protocol stack on the network side in the handover process is shown in FIG. 9. Both a protocol stack of the source cell belonging to the first network device and a protocol stack of a target cell belonging to the second network device include a PDCP entity, an RLC entity, and a MAC entity.

It can be learned from FIG. 9 that the source cell and the target cell have respective independent PDCP entities used to implement data encryption/decryption, integrity protection, and sequential delivery. In the handover process, a PDCP layer of the source cell notifies a PDCP layer of the target cell of an SN number from which a number allocated to a data packet to be transmitted in the target cell starts.

The first network device releases the protocol stack of the source cell, and the protocol stack of the target cell of the second network device remains unchanged.

Figure 10:
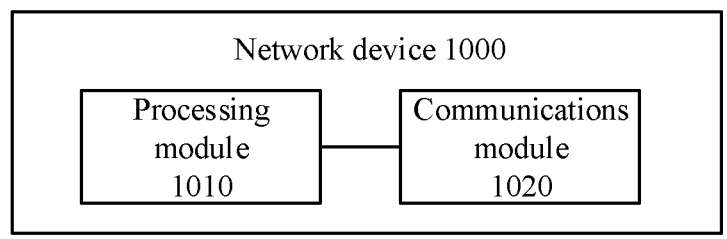
FIG. 10 is a schematic structural diagram of a network device according to an embodiment of this application.

FIG. 10 is a schematic structural diagram of a network device according to an embodiment of this application. The network device may implement the functions of the first network device in the embodiments of FIG. 2 to FIG. 4. It should be understood that a network device 1000 shown in FIG. 10 is merely an example. The network device in this embodiment of this application may further include another module or unit, or may include modules with functions similar to those of modules in FIG. 10, or may not include all modules in FIG. 10.

A processing module 1010 is configured to determine at least one candidate target cell and first configuration information, where the first configuration information is used to trigger a terminal to determine one of the at least one candidate target cell as a to-be-handed-over-to cell, and the network device is a network device to which a serving cell currently accessed by the terminal belongs.

A communications module 1020 is configured to send a first message to the terminal, where the first message includes first cell indication information and the first configuration information, and the first cell indication information is used to indicate the at least one candidate target cell.

The network device sends the first cell indication information and the first configuration information to the terminal, so that the terminal may determine, based on the first configuration information, whether the terminal needs to be handed over to the candidate target cell indicated by the first cell indication information, and determine a cell that is of the at least one candidate target cell and to which the terminal needs to be handed over. Then the terminal may be handed over to the cell. In this way, even if the terminal moves fast or there is an obstacle between the terminal and a source base station affecting signal quality between the terminal and the source base station, the terminal can still be handed over to a target cell, so that a handover success rate of the terminal can be increased and communication quality of the terminal is improved.

Optionally, the first message further includes at least one of the following information: valid time of the first message, first indication information, or second configuration information, the first indication information is used to indicate a handover priority of the at least one candidate target cell, and the second configuration information is used by the terminal to cancel an operation of determining, based on the first message, the to-be-handed-over-to cell.

Optionally, the communications module is further configured to send a second message to a second network device, where the second message includes indication information of a second cell belonging to the second network device. The communications module is further configured to receive a response message for the second message, where the response message for the second message includes indication information of a cell that is of the second cell and that the terminal is allowed to access. The processing module is specifically configured to determine the at least one candidate target cell based on the indication information of the cell that is of the second cell and that the terminal is allowed to access.

Optionally, the second message further includes a context of the terminal.

Optionally, the second message further includes valid time of the context.

Optionally, the response message for the second message further includes third configuration information, the third configuration information includes at least one of the following information: a first temporary identifier or information about a first dedicated random access channel RACH preamble, and the first temporary identifier and the information about the first dedicated RACH preamble are used by the terminal to access all or some cells that are of the second cell and that the terminal is allowed to access; and the first message further includes the third configuration information.

Optionally, the communications module is further configured to send second indication information to the second network device, where the second indication information is used to indicate the second network device to release a resource allocated, based on the second message, by the second network device to the terminal.

Optionally, the communications module is further configured to send third indication information to the terminal, where the third indication information is used to indicate the terminal to cancel the operation of determining, based on the first message, the to-be-handed-over-to cell.

Optionally, the communications module is further configured to receive fourth indication information sent by the terminal, where the fourth indication information is used to indicate the first network device to send the first message to the terminal; and the communications module is specifically configured to send the first message to the terminal according to the fourth indication information.

Optionally, the communications module is further configured to receive a first notification message sent by the terminal, where the first notification message carries indication information of the to-be-handed-over-to cell; and the communications module is further configured to send, based on the first notification message, data of the terminal and a sequence number status transfer message to a network device to which the to-be-handed-over-to cell belongs.

Optionally, the first configuration information includes at least one of the following information: signal quality threshold information, fifth indication information, or sixth indication information, where the signal quality threshold information is used to trigger the terminal to determine the to-be-handed-over-to cell when a difference between signal quality of the serving cell and signal quality of a cell of the at least one candidate target cell is greater than or equal to a signal quality difference threshold, or when signal quality of the serving cell is less than a first signal quality threshold and signal quality of a cell of the at least one candidate target cell is greater than or equal to a second signal quality threshold; the fifth indication information is used to indicate transmission failure quantity threshold information, and the transmission failure quantity threshold information is used to trigger, after a transmission failure quantity of the terminal reaches a transmission failure quantity threshold, the terminal to perform the operation of determining the to-be-handed-over-to cell; and the sixth indication information is used to indicate a radio link failure event, and the radio link failure event is used to trigger, after a radio link of the terminal fails, the terminal to perform the operation of determining the to-be-handed-over-to cell.

It should be understood that for details about the foregoing operations and/or functions or other operations and/or functions of the modules of the network device in this embodiment of this application in FIG. 10, further refer to a corresponding procedure performed by the first network device in each of the embodiments of FIG. 2 to FIG. 4. For brevity, details are not described herein again.

Figure 11:
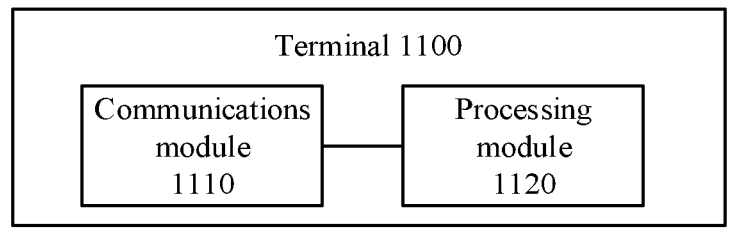
FIG. 11 is a schematic structural diagram of a terminal according to an embodiment of this application.

FIG. 11 is a schematic structural diagram of a terminal according to an embodiment of this application. The terminal is configured to implement the functions of the terminal in the embodiments of FIG. 2 to FIG. 4. It should be understood that a terminal 1100 shown in FIG. 11 is merely an example. The terminal in this embodiment of this application may further include another module or unit, or may include modules with functions similar to those of modules in FIG. 11, or may not include all modules in FIG. 11.

A communications module 1110 is configured to receive a first message sent by a first network device, where the first message includes first cell indication information and first configuration information, the first cell indication information is used to indicate at least one candidate target cell, the first configuration information is used to trigger the terminal to determine one cell of the at least one candidate target cell as a to-be-handed-over-to cell, and the first network device is a network device to which a serving cell currently accessed by the terminal belongs.

A processing module 1120 is configured to determine the to-be-handed-over-to cell in the at least one candidate target cell based on the first message.

The terminal receives the first cell indication information and the first configuration information that are sent by the first network device, determines, based on the first configuration information, whether the terminal needs to be handed over to the candidate target cell indicated by the first cell indication information, and determines a cell that is of the at least one candidate target cell and to which the terminal needs to be handed over. Then the terminal may be handed over to the cell. In this way, even if the terminal moves fast or there is an obstacle between the terminal and a source base station affecting signal quality between the terminal and the source base station, the terminal can still be handed over to a target cell, so that a handover success rate of the terminal can be increased and communication quality of the terminal is improved.

Optionally, the first message further includes at least one of the following information: valid time of the first message, first indication information, or second configuration information, the first indication information is used to indicate a handover priority of the at least one candidate target cell, and the second configuration information is used by the terminal to cancel an operation of determining, based on the first message, the to-be-handed-over-to cell.

Optionally, the first message further includes third configuration information, the third configuration information includes at least one of the following information: a first temporary identifier or information about a first dedicated random access channel RACH preamble, and the first temporary identifier and the information about the first dedicated RACH preamble are used by the terminal to access a cell that is of a second cell belonging to a second network device and that the terminal is allowed to access.

Optionally, the communications module is further configured to receive third indication information sent by the first network device, where the third indication information is used to indicate the terminal to cancel the operation of determining, based on the first message, the to-be-handed-over-to cell.

Optionally, the communications module is further configured to send fourth indication information to the first network device, where the fourth indication information is used to indicate the first network device to send the first message to the terminal; and the communications module is specifically configured to receive the first message that is sent by the first network device according to the fourth indication information.

Optionally, the communications module is further configured to send a first notification message to the first network device, where the first notification message carries indication information of the to-be-handed-over-to cell, so that the first network device sends, based on the first notification message, data of the terminal and a sequence number status transfer message to a network device to which the to-be-handed-over-to cell belongs.

Optionally, the first configuration information includes at least one of the following information: signal quality threshold information, fifth indication information, or sixth indication information, where the signal quality threshold information is used to trigger the terminal to determine the to-be-handed-over-to cell when a difference between signal quality of the serving cell and signal quality of a cell of the at least one candidate target cell is greater than or equal to a signal quality difference threshold, or when signal quality of the serving cell is less than a first signal quality threshold and signal quality of a cell of the at least one candidate target cell is greater than or equal to a second signal quality threshold; the fifth indication information is used to indicate transmission failure quantity threshold information, and the transmission failure quantity threshold information is used to trigger, after a transmission failure quantity of the terminal reaches a transmission failure quantity threshold, the terminal to perform the operation of determining the to-be-handed-over-to cell; and the sixth indication information is used to indicate a radio link failure event, and the radio link failure event is used to trigger, after a radio link of the terminal fails, the terminal to perform the operation of determining the to-be-handed-over-to cell.

It should be understood that for details about the foregoing operations and/or functions or other operations and/or functions of the units of the terminal in this embodiment of this application in FIG. 11, further refer to a corresponding procedure performed by the terminal in each of the embodiments of FIG. 2 to FIG. 4. For brevity, details are not described herein again.

Figure 12:
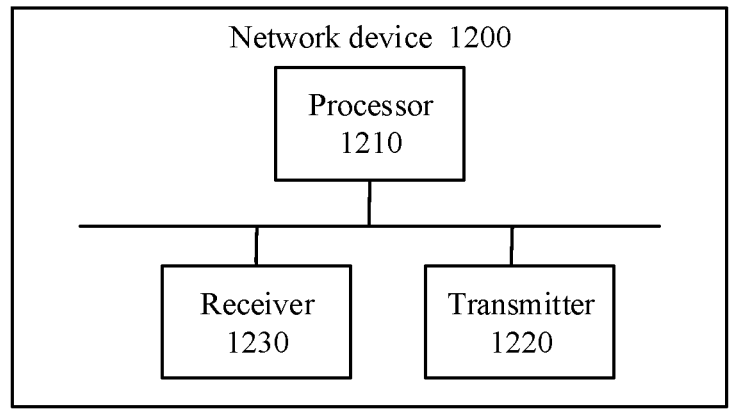
FIG. 12 is a schematic structural diagram of a network device according to another embodiment of this application.

FIG. 12 is a schematic structural diagram of a network device according to another embodiment of this application. The network device is configured to implement the functions of the first network device in the embodiments of FIG. 2 to FIG. 4. It should be understood that a network device 1200 shown in FIG. 12 is merely an example. The network device in this embodiment of this application may further include another module or unit, or may include modules with functions similar to those of modules in FIG. 12, or may not include all modules in FIG. 12.

A processor 1210 may be configured to implement the operations or steps that can be implemented by the processing module 1010 in FIG. 10. A transmitter 1220 may be configured to implement some operations or steps that can be implemented by the communications module 1020 in FIG. 10. A receiver 1230 may be configured to implement some operations or steps that can be implemented by the communications module 1020 in FIG. 10. For brevity, details are not described herein again. It may be understood that the transmitter 1220 and the receiver 1230 may exist independently or may be integrated.

Optionally, the network device 1200 may further include a memory. The memory is configured to store data and/or an instruction. The processor 1210 may invoke the instruction in the memory to implement a corresponding method. The memory may exist independently, or may be integrated with other functional units. This is not limited in this embodiment of this application.

Figure 13:
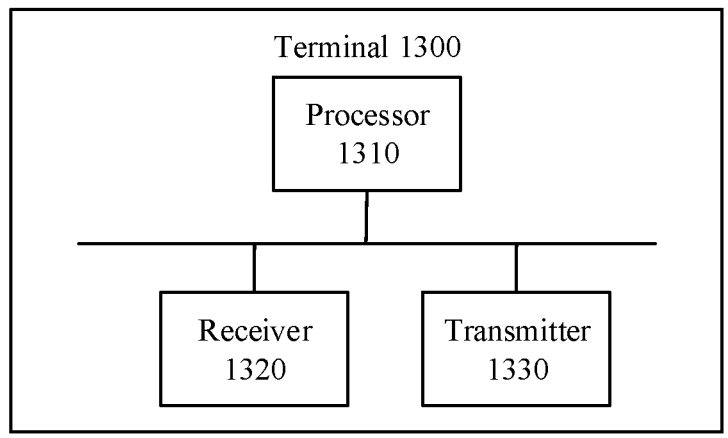
FIG. 13 is a schematic structural diagram of a terminal according to another embodiment of this application.

FIG. 13 is a schematic structural diagram of a terminal according to another embodiment of this application. The terminal is configured to implement the functions of the terminal in the embodiments of FIG. 2 to FIG. 4. It should be understood that a terminal 1300 shown in FIG. 13 is merely an example. The terminal in this embodiment of this application may further include another module or unit, or may include modules with functions similar to those of modules in FIG. 13, or may not include all modules in FIG. 13.

A processor 1310 may be configured to implement the operations or steps that can be implemented by the processing module 1120 in FIG. 11. A receiver 1320 may be configured to implement some operations or steps that can be implemented by the communications module 1110 in FIG. 11. A transmitter 1330 may be configured to implement some operations or steps that can be implemented by the communications module 1110 in FIG. 11. For brevity, details are not described herein again. It may be understood that the transmitter 1330 and the receiver 1320 may exist independently or may be integrated.

Optionally, the terminal 1300 may further include a memory. The memory is configured to store data and/or an instruction. The processor 1310 may invoke the instruction in the memory to implement a corresponding method. The memory may exist independently, or may be integrated with other functional units. This is not limited in this embodiment of this application.

Figure 14:
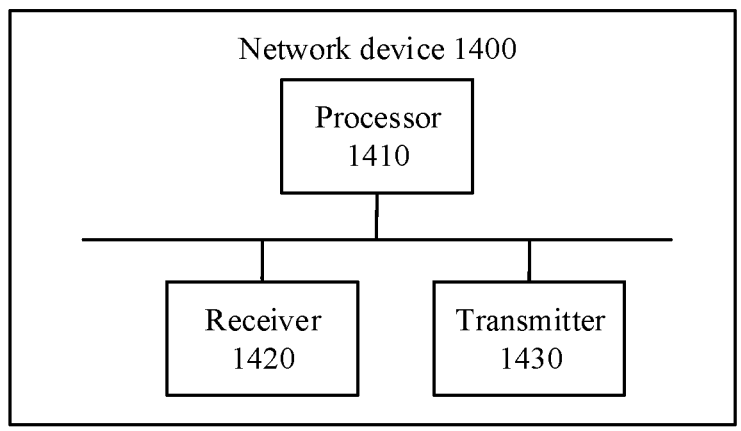
FIG. 14 is a schematic structural diagram of a network device according to another embodiment of this application.

FIG. 14 is a schematic structural diagram of a network device according to another embodiment of this application. The network device is configured to implement the functions of the second network device in the embodiments of FIG. 2 to FIG. 4. It should be understood that a network device 1400 shown in FIG. 14 is merely an example. The network device in this embodiment of this application may further include another module or unit, or may include modules with functions similar to those of modules in FIG. 14, or may not include all modules in FIG. 12.

A receiver 1420 may be configured to receive a second message sent by a first network device, where the second message includes a context of a terminal and valid time of the context. A transmitter 1430 may be configured to send a response message for the second message to the first network device. If the second message includes indication information of a second cell of the network device 1400, a processor 1410 may be configured to determine a cell that is of the second cell and that the terminal is allowed to access.

In addition, the response message for the second message may include indication information used to indicate the cell that the network device 1400 allows the terminal to access.

Optionally, the processor 1410 may be further configured to allocate, to the terminal, a temporary identifier or a dedicated RACH preamble that is used to access each of the cell that the network device 1400 allows the terminal to access. In this case, the response message for the second message may further include the temporary identifier or information about the dedicated RACH preamble.

Optionally, the receiver 1420 may be further configured to receive second indication information sent by the first network device, where the second indication information is used to indicate the network device 1400 to release the context of the terminal. In this case, the processor 1410 may be further configured to release the context of the terminal according to the second indication information.

Optionally, if the network device 1400 allocates the temporary identifier or the dedicated RACH preamble to the terminal, the processor 1410 may be further configured to release the temporary identifier or the dedicated RACH preamble according to the second indication information.

Optionally, the processor 1410 may be further configured to update the context of the terminal based on a new second message, or update the temporary identifier or the dedicated RACH preamble allocated to the terminal.

The processor 1410, the receiver 1420, and the transmitter 1430 are configured to implement corresponding operations or steps implemented by the second network device in the embodiments in FIG. 2 to FIG. 4. For brevity, details are not described herein again. It may be understood that the transmitter 1430 and the receiver 1420 may exist independently or may be integrated.

Optionally, the network device 1400 may further include a memory. The memory is configured to store data and/or an instruction. The processor 1410 may invoke the instruction in the memory to implement a corresponding method. The memory may exist independently, or may be integrated with other functional units. This is not limited in this embodiment of this application.

This application further provides a terminal. The terminal is configured to implement the functions of the terminal in the embodiments of FIG. 5 to FIG. 9. The terminal may include a memory and a processor. The memory is configured to store code, and the processor is configured to execute code in the memory. The processor and the memory may exist independently, or may be integrated together.

In addition, the terminal may further include a receiver and a transmitter. The receiver and the transmitter are configured to communicate with another device. The receiver and the transmitter may be integrated into a transceiver.

This application further provides a network device. The network device is configured to implement the functions of the first network device in the embodiments of FIG. 5 to FIG. 9. The network device may include a memory and a processor. The memory is configured to store code, and the processor is configured to execute code in the memory. The processor and the memory may exist independently, or may be integrated together.

In addition, the network device may further include a receiver and a transmitter. The receiver and the transmitter are configured to communicate with another device. The receiver and the transmitter may be integrated into a transceiver.

This application further provides a network device. The network device is configured to implement the functions of the second network device in the embodiments of FIG. 5 to FIG. 9. The network device may include a memory and a processor. The memory is configured to store code, and the processor is configured to execute code in the memory. The processor and the memory may exist independently, or may be integrated together.

In addition, the network device may further include a receiver and a transmitter. The receiver and the transmitter are configured to communicate with another device. The receiver and the transmitter may be integrated into a transceiver.

A person of ordinary skill in the art may be aware that the units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

It may be clearly understood by a person skilled in the art that for the purpose of convenient and brief description, for details about a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate. Parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

All or some of the foregoing embodiments may be implemented by software, hardware, firmware, or any combination thereof. When software is used to implement the embodiments, some or all of the embodiments may be implemented in a form of a computer program product. The computer program product includes one or more computer instructions. When the computer program instructions are loaded and executed on a computer, some or all of the procedure or functions according to the embodiments of the present invention are generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, for example, a server or a data center integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method applied in a terminal, comprising:
receiving a first message from a first network device to which a source cell of the terminal belongs, wherein the first message comprises first indication information, the first indication information indicating to the terminal to maintain data transmission with the first network device until second indication information for releasing the source cell is received by the terminal, and the first message indicating to the terminal to hand over to a target cell, wherein the target cell belongs to a second network device;
establishing a media access control (MAC) entity and a radio link control (RLC) entity that correspond to the second network device, wherein a packet data convergence protocol (PDCP) entity corresponding to the second network device and a PDCP entity corresponding to the first network device are a same PDCP entity, and wherein the same PDCP entity is configured with a first security key corresponding to the first network device and a second security key corresponding to the second network device;
maintaining, according to the first message, the data transmission with the first network device until releasing the source cell; and
by use of the same PDCP entity, communicating with the first network device using the first security key corresponding to the first network device, and communicating with the second network device using the second security key corresponding to the second network device.

2. The method according to claim 1, wherein a second message is sent to the second network device indicating completion of handover of the terminal.

3. The method according to claim 2, further comprising:
after the second message is sent to the second network device,
receiving the second indication information from the second network device; and
releasing, according to the second indication information, a protocol stack corresponding to the source cell.

4. The method of claim 1, wherein the PDCP entity corresponding to the second network device and the PDCP entity corresponding to the first network device are the same PDCP entity for data encryption/decryption and integrity protection.

5. A method comprising:
generating, by a first network device to which a source cell of a terminal belongs, a first message, wherein the first message comprises first indication information, the first indication information indicating to the terminal to maintain data transmission with the first network device until second indication information for releasing the source cell is received by the terminal, and the first message indicating to the terminal to hand over to a target cell, wherein the target cell belongs to a second network device; and
sending, by the first network device, the first message to the terminal,
wherein the terminal establishes a media access control (MAC) entity and a radio link control (RLC) entity that correspond to the second network device, wherein a packet data convergence protocol (PDCP) entity corresponding to the second network device and a PDCP entity corresponding to the first network device are a same PDCP entity, and wherein the same PDCP entity is configured with a first security key corresponding to the first network device and a second security key corresponding to the second network device.

6. The method according to claim 5, wherein the method further comprises:
before sending, by the first network device, the first message to the terminal,
sending, by the first network device, a second message to the second network device, the second message indicating that the terminal maintains, in a handover process, the data transmission with the first network device until releasing the source cell.

7. The method according to claim 5, further comprising:
sending, by the second network device, the second indication information to the terminal to indicate the terminal to release a protocol stack corresponding to the source cell.

8. The method of claim 5, wherein the PDCP entity corresponding to the second network device and the PDCP entity corresponding to the first network device are the same PDCP entity for data encryption/decryption and integrity protection.

9. A communications apparatus comprising:
at least one processor and a non-transitory memory, wherein the at least one processor is coupled to the non-transitory memory storing a computer program or instructions, and the at least one processor is configured to execute the computer program or the instructions in the non-transitory memory, to cause the communications apparatus to:
receive a first message from a first network device to which a source cell of the communications apparatus belongs, wherein the first message comprises first indication information, the first indication information indicating to the communications apparatus to maintain data transmission with the first network device until second indication information for releasing the source cell is received by the communications apparatus, and the first message indicating the communications apparatus to hand over to a target cell, wherein the target cell belongs to a second network device;
establish a media access control (MAC) entity and a radio link control (RLC) entity that correspond to the second network device, wherein a packet data convergence protocol (PDCP) entity corresponding to the second network device and a PDCP entity corresponding to the first network device are a same PDCP entity, and wherein the same PDCP entity is configured with a first security key corresponding to the first network device and a second security key corresponding to the second network device;
maintain, according to the first message, the data transmission with the first network device until releasing the source cell is received by the communications apparatus; and
by use of the same PDCP entity, communicate with the first network device using the first security key corresponding to the first network device, and communicate with the second network device using the second security key corresponding to the second network device.

10. The communications apparatus according to claim 9, wherein a second message is sent to the second network device indicating completion of handover of the communications apparatus.

11. The communications apparatus according to claim 9, wherein the communications apparatus is further caused to:
receive the second indication information from the second network device; and
release, according to the second indication information, a protocol stack corresponding to the source cell.

12. The communications apparatus of claim 9, wherein the PDCP entity corresponding to the second network device and the PDCP entity corresponding to the first network device are the same PDCP entity for data encryption/decryption and integrity protection.

* * * * *